S. A. SMITH.
INTERBEARING BLOCK.
APPLICATION FILED JAN. 25, 1919.

1,306,678.

Patented June 10, 1919.
2 SHEETS—SHEET 1.

INVENTOR
S. A. Smith
BY
Fred G. Dieterich
ATTORNEYS

S. A. SMITH.
INTERBEARING BLOCK.
APPLICATION FILED JAN. 25, 1919.
1,306,678.
Patented June 10, 1919.
2 SHEETS—SHEET 2.
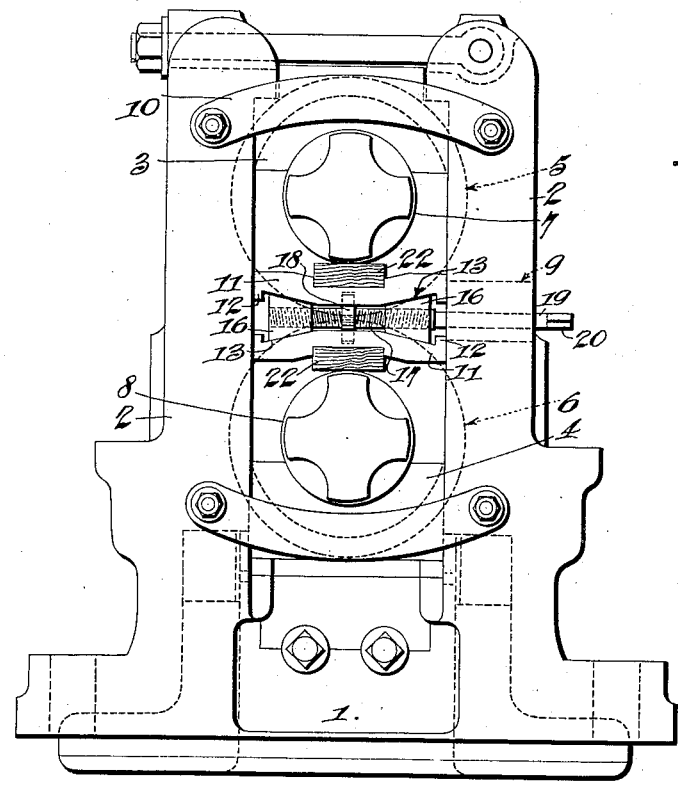
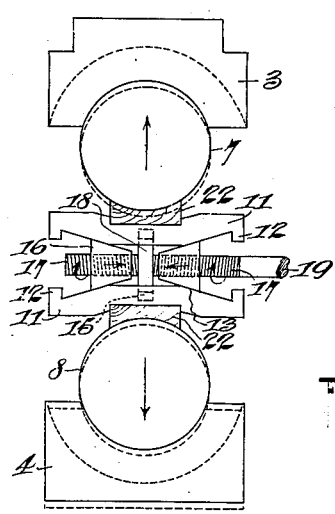
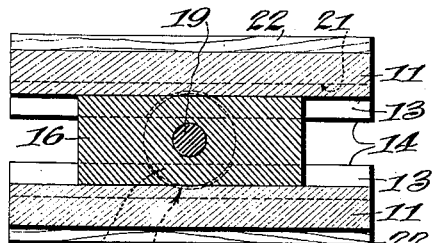
INVENTOR
S. A. Smith.
BY
Fred J. Dieterich
ATTORNEYS

UNITED STATES PATENT OFFICE.

SHERIDAN A. SMITH, OF HAMILTON, ONTARIO, CANADA.

INTERBEARING-BLOCK.

1,306,678.  Specification of Letters Patent.  Patented June 10, 1919.

Application filed January 25, 1919. Serial No. 273,083.

*To all whom it may concern:*

Be it known that I, SHERIDAN A. SMITH, a citizen of the United States, at present residing at Hamilton, in the Province of Ontario, Dominion of Canada, have invented a new and Improved Interbearing-Block, of which the following is a specification.

My invention relates to bearing blocks used between the necks or axles of rolls of metal rolling mills to keep the rolls apart and prevent damage to the passes which are turned in the body of the rolls and also to keep the slack motion out of the mill. In rolling mills, a set of rolls which jumps when the steel enters between them is hard on the bearings and on the rolls and results frequently in damaging the same. When operating on light material it will cause the first end to be smaller and wider and therefore the steel will stick to the delivery or entrant guides of the mill, which sticking will cause a cobble. The inter-bearing devices now in more or less common use are made of wood but when they have been in use for several hours they become worn. As the means heretofore employed for tightening up these blocks or taking care of the wear does not operate to bring these blocks up level, it throws the roll bearings out of line which causes uneven wear and misalinement of the rolls. My invention primarily has for its object to provide an inter-bearing which will avoid the defects above noted and give complete control of all wear in the bearing and allow the attendant to take up all the slack motion without wear and at all times keep the bearings in true line, thereby saving undue wear and avoiding delays incident to shut downs of the mill for adjustment and replacement of bearings or rolls that have become damaged by the failure of the inter-bearings to properly function.

Another object of the invention is to reduce the amount of wood used in the bearings over what is at present employed and to provide for the quick renewal of the wooden blocks at a minimum expense for replacement and at minimum cost in labor and time lost by shut-down of the rolls.

In its generic nature, the invention comprises a pair of bearing block carrier plates which are interposed between the upper and lower shanks or spindles of the upper and lower rolls in a direction transversely to the same, the plates themselves being provided with cross recesses to receive the wooden bearing blocks and hold them in parallelism with the axis of the rolls, means being provided between the carrier blocks of a pair to cause the blocks to separate one from the other with parallel motion, thereby taking up wear in the bearing blocks and maintaining the proper adjustment of the upper and lower rolls with relation to one another to keep the passes in their proper form.

More specifically, the invention includes those novel details of construction, combination and arrangement of parts, all of which will be first fully described, then be specifically pointed out in the appended claims and illustrated in the accompanying drawings, in which:

Fig. 2 is a front elevation of the same.

Fig. 3 is a diagrammatic side elevation looking endwise of the rolls and showing the location of the inter-bearing and indicating the action or thrust of the rolls of the take-up device.

Fig. 6 is a cross section on substantially the line 6—6 of Fig. 4.

Figure 1:
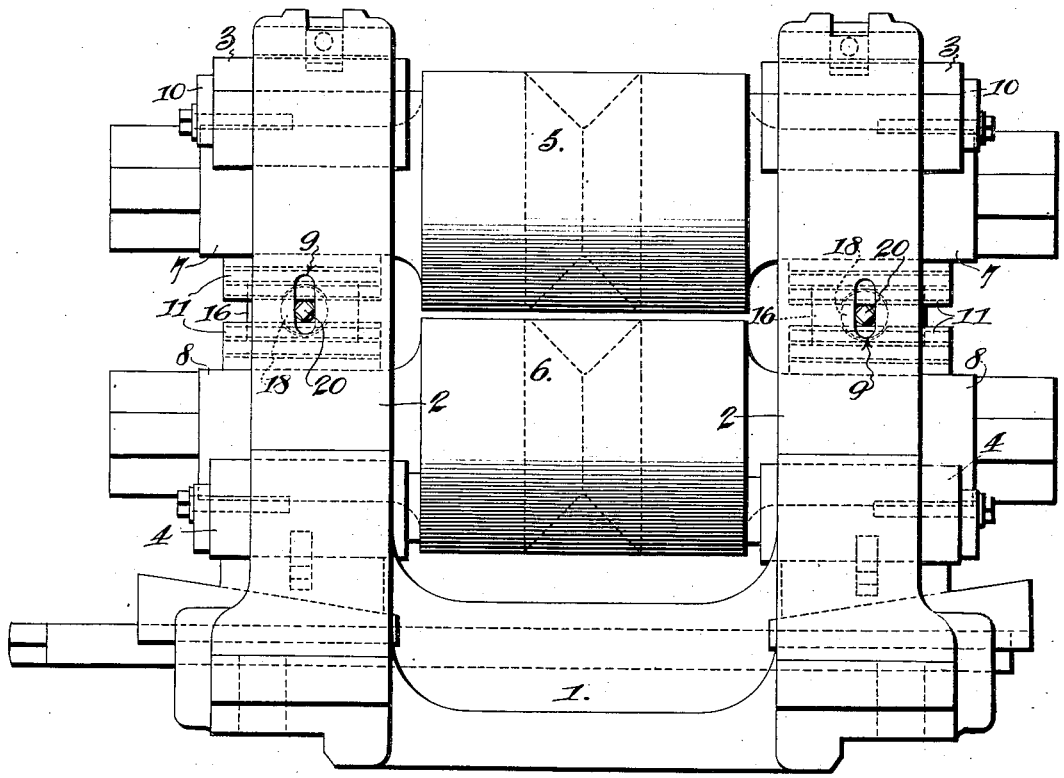
Figure 1 is a side elevation of a set of rolls with my invention applied.
Figure 5:
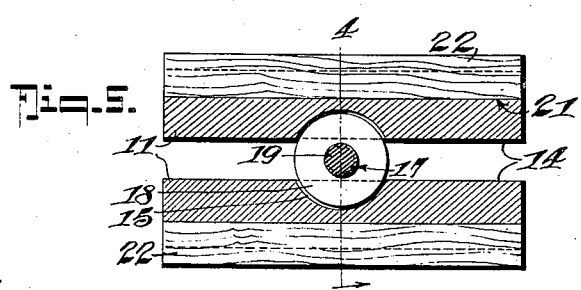
Fig. 5 is a cross section on substantially the line 5—5 of Fig. 4.
Figure 4:
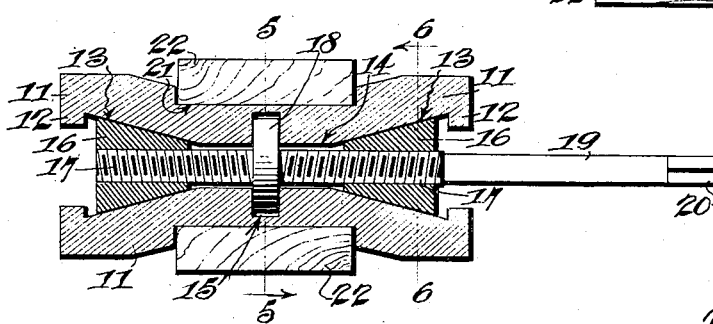
Fig. 4 is an enlarged vertical section of one of the inter-bearing guides which constitutes the essence of my invention, the section being taken substantially on the line 4—4 of Fig. 5.

In the drawings in which like numerals of reference indicate like parts in all of the figures, and in which a preferred embodiment of my invention is illustrated, 1 represents the usual roll sustaining base which is provided with the pairs of standards 2 that carry the upper and lower bearings 3 and 4 for the spindles or neck portions 7 and 8 of the rolls 5 and 6 respectively; the bearings 3 and 4 being designed to take the up and down thrust on the rolls as the billet goes through the roll pass. One of the uprights 2 of each pair is slotted at 9 to permit the adjusting screw 19 of the inter-bearing device to pass through.

10 designates the device for holding the bearings 3 and 4 against displacement in the uprights. All of the construction of the parts heretofore mentioned, excepting the part 19, may be of the usual and presentday accepted construction and, *per se*, constitutes no part of the present invention.

The inter-bearing which constitutes the essence of my invention comprises a pair of carrier plates 11—11 of substantially the same form or configuration, the plates 11—11 being located between the respective ones of the pairs of uprights 2 and lie in a direction transverse to the axis of the rolls.

The plates 11—11 have cross recesses or grooves 21 in which the bearing blocks 22 of wood are located, the blocks 22 extending transversely of the plates 11 but parallel with the ends of the rolls 5 and 6 and are adapted to engage the spindle or necks 7 and 8 of the rolls, as clearly shown in Figs. 1, 2 and 3 of the drawings.

Each plate 11 has end flanges 12 to form limiting stops for the wedges 16 that coöperate with the wedge surfaces 13 of the respective plates 11, there being a wedge 16 and wedge surfaces 13 near each end of the plates 11.

Each plate 11 is provided with a concaved recess 15 for the collar 18 that is carried by the screw shaft 19, the shaft 19 being threaded at each side of the collar at 17, the threads at one side being right hand threads and those at the other side being left hand threads, whereby as the shaft 19 is turned (through the medium of a crank or key, not shown, attached to the squared end 20) the wedges 16 will be moved toward or from one another according to the direction in which the shaft 19 is turned, the collar 18 of the shaft coöperating with the recesses 15 to prevent longitudinal movement of the shaft 19.

In operation, when the rolls begin to loosen in their bearings, the operator merely turns the shaft 19 to move wedge blocks 16 toward one another and thereby toward the central vertical plane, which passes through the axis of the rolls and through the collar 18, thus moving the plates 11 farther apart, while maintaining them parallel to their first position.

In this way, the thrust on the rolls is always in a vertical plane, which is normal to the direction of travel of the bar through the roll pass. This enables the wear on the bearings 3 and 4 to take place in the uniform way and in the intended direction.

By my construction, it will also be seen that, when it is necessary to replace the blocks 22, by reason of the same becoming worn, it is a very simple matter to reverse the action of the screw 19, to force the wedges 16 apart, let the plates 11 come together and then the blocks 22 can be readily removed and new ones substituted without the necessity of taking the machine apart or removing the plates 11 from their position between the uprights 2.

It will be observed that when once installed, my inter-bearing blocks will effect a big saving in the cost of the upkeep of the mill. There is only about one-fourth the usual amount of wood used in my improved bearing and, when the same is worn, the screw can be loosened and the wooden bearings removed and replaced with new ones with great facility.

With the present inter-bearing blocks now in use, the inter-bearings are discarded on account of the wearing out of line.

From the foregoing description taken in connection with the accompanying drawings, it is thought the construction, operation and advantages of the invention will be clear to those skilled in the art.

What I claim is:

1. The combination with the bearings-supporting uprights, the upper and lower roll spindles projecting between the same and the upper and lower outer bearings for said spindles; of inter-bearings, each comprising a pair of carrier plates extended across between said uprights, said plates having centrally disposed bearing block grooves, bearing blocks mounted in said grooves and opposing wedges held between the cross plates of the pair, there being a wedge adjacent to each end of the plate, and means for simultaneously moving said wedges toward the center of the cross plate to spread the said plates apart with parallel movement and thereby move the bearing blocks correspondingly.

2. The combination with the bearings-supporting uprights, the upper and lower roll spindles projecting between the same and the upper and lower outer bearings for said spindles; of inter-bearings, each comprising a pair of carrier plates extended across between said uprights, said plates having centrally disposed bearing block grooves, bearing blocks mounted in said grooves and opposing wedges held between the cross plates of the pair, there being a wedge adjacent to each end of the plate, a screw shaft having right and left threads engaging the wedges and extending through the slot in one of the uprights, whereby it may be manipulated to operate the wedges, and a collar and recess connection between said screw shaft and said carrier plates to hold said screw shaft against endwise movement and means for simultaneously moving said wedges toward the center of the cross plate to spread the said plates apart with parallel movement and thereby move the bearing blocks correspondingly.

3. An inter-bearing of the character described comprising a pair of carrier plates having transverse bearing block receiving recesses in their outer faces, bearing blocks held in said recesses and extending transversely of said plates, said plates having concaved recesses in their opposing faces located in the central transverse plane of the plates and having wedge surfaces toward the ends of the plates to each side of said concaved recesses, wedge blocks located between said plates and in coöperative engagement with said wedge surfaces, a screw shaft projecting between said plates and having right and left threads engaging the respective wedge blocks, a collar on said screw shaft seated in said concaved recesses to restrain said screw shaft against longitudinal movement, and means on the plates limiting the outward movement of the wedge blocks, all being arranged substantially as shown and described.

4. In combination with the upper and lower rolls having bearing spindles, the upper and lower spindle bearings and the uprights for supporting said bearings; of inter-bearings, said inter-bearings comprising a pair of bearing blocks lying in the direction of the axes of the rolls, a pair of bearing block carrier plates located between the upper and lower bearing blocks of the inter-bearing and lying transversely with respect thereto, and devices interposed between the said plates for separating the same with parallel motion and thrust said blocks in a straight line apart, the line of thrust being through the axis of the rolls and lying normal to the direction of run of the mill through the pass between the rolls.

SHERIDAN A. SMITH.